United States Patent [19]

Jaeger

[11] 3,890,710

[45] June 24, 1975

[54] DENTAL DOWEL PIN POSITIONING AND ALIGNING APPARATUS

[76] Inventor: Charles G. Jaeger, 1340 N. Pike Lake Ct., Minneapolis, Minn. 55112

[22] Filed: Apr. 12, 1974

[21] Appl. No.: 460,385

[52] U.S. Cl. ................................................... 32/11
[51] Int. Cl. .......................................... A61c 13/00
[58] Field of Search ............................... 32/11, 40 R

[56] References Cited
UNITED STATES PATENTS 3,650,032  5/1972  Kestler .................................. 32/11

*Primary Examiner*—Robert Peshock
*Attorney, Agent, or Firm*—James V. Harmon

[57] ABSTRACT

A dowel pin holder and aligning apparatus is provided for aligning and retaining dowel pins in selected positions during a dental casting operation in making a positive replica of a tooth from a negative impression which is formed in an impression material. The apparatus consists of the supporting plate or base upon which is mounted a removable dental tray support or impression holder positioned to receive the dental impression in which the dowel pins are placed. A temporary dowel pin holder is provided above the tray. The temporary pin holder includes a substantially homogenous pierceable surface formed from a deformable retaining material within which the dowel pins remain once they are imbedded therein. The temporary retainer is supported on a slidable mounting element so that it can be moved with respect to the base and tray along an axis parallel to the axis of the pins. During use, each pin is placed in the desired location within a tooth impression in the tray. Relative sliding motion is then established between the tray and the temporary retainer while the dowel pin is held in a fixed position within its tooth impression. This forces the dowel pin into the pierceable surface of the deformable retaining material which then holds it in that position. Additional pins are subsequently imbedded one by one in the temporary retainer until all of the pins have been properly located. The retainer is then moved to a position in which all of the pins are simultaneously transferred to their proper positions within the impression and a layer of stone is cast around their lower ends. Another layer is then cast around the exposed portions of the pins.

11 Claims, 3 Drawing Figures

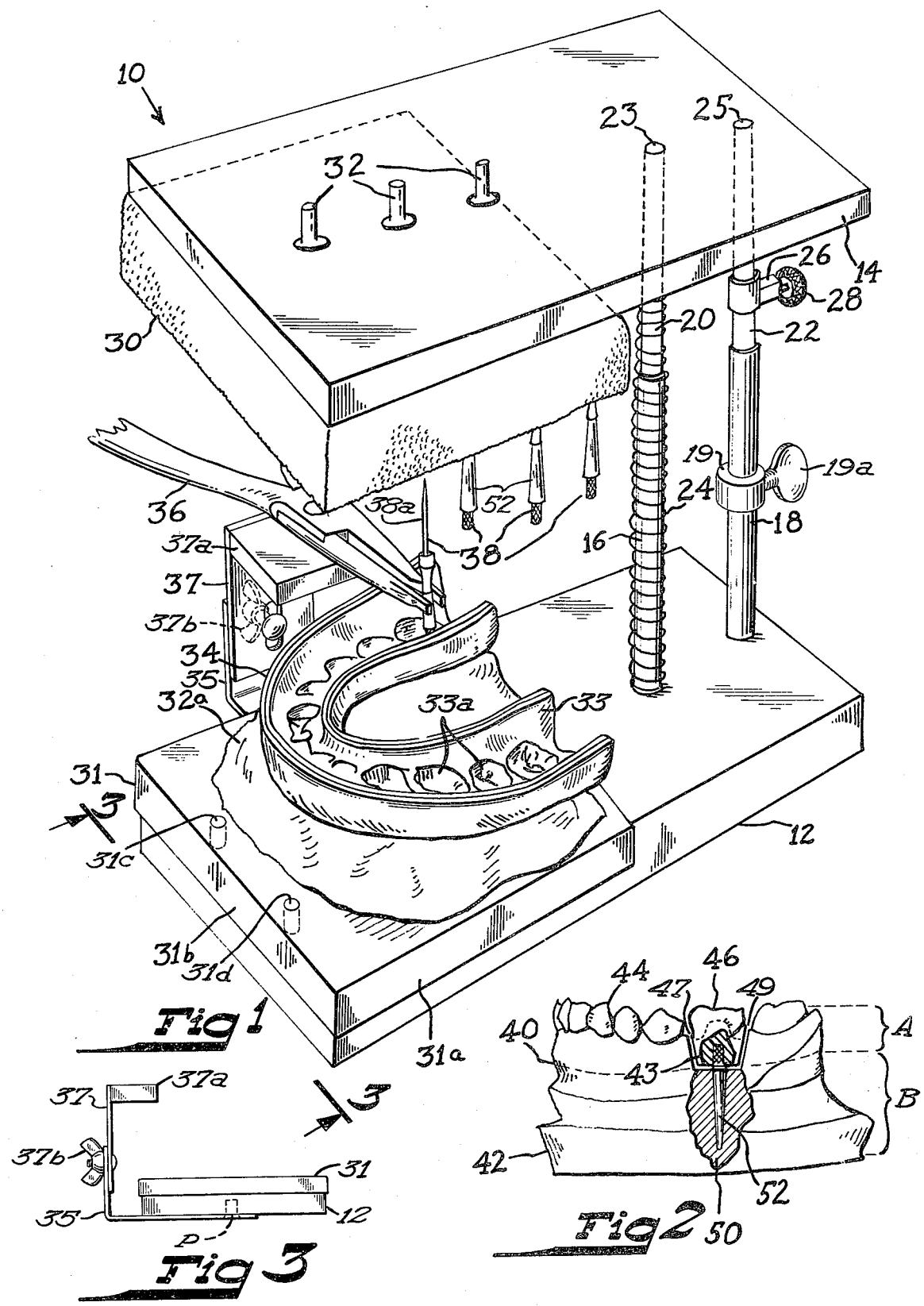

DENTAL DOWEL PIN POSITIONING AND ALIGNING APPARATUS

FIELD OF THE INVENTION

The invention relates to an apparatus for preparing dental appliances and more particularly to a dowel pin positioning and temporary retaining apparatus for properly locating dowel pins in making dental bridges, artificial teeth and the like.

THE PRIOR ART

To form the model of teeth which are to be prepared; it is the usual practice to prepare the negative impression of the teeth. After this is done, a dowel pin is placed substantially in the center of the negative impression of the particular teeth that require work. Two kinds of die material are used. With the dowel pin in position a first layer of die material is poured into the negative impression around the pin. After this die material is cured or set up hard, a second layer is made by casting a base stone on top of the first. A base stone is usually made separable from the original impression of the teeth by a separation layer which can consist of wax. The tooth die is lifted from the mold after first cutting the die material with a saw from the adjacent die material. It is then removed simply by lifting the replica of the tooth.

A great many appliances have been previously proposed for placing and aligning the dowel pins in the negative tooth impressions. These have been both complicated in construction and time consuming to use. They have also been expensive and have often produced inconsistent results. It has been previously recognized, for example, in U.S. Pat. No. 3,469,316 that there is a problem of properly positioning the dowel pin in the middle of the negative impression or on an inclined axis. Thus, if the longitudinal axis of the dowel pin is located at a substantial angle relative to the vertical axis of the tooth impression, the model may be ruined when the tooth die is separated from the base stone. Additionally, if the dowel extends into an adjacent tooth, the removal of a selected tooth die is extremely difficult or impossible. The dowel pin in addition cannot touch the side wall of the impression or the tooth will be ruined by the projecting surface of the dowel pin. Accordingly, the dowel pin should be maintained in a vertical position in approximately the center of the tooth impression and spaced from the surface of the impression.

It has also been previously proposed to provide a support over the dental impression in which a great many holes are drilled. Vertically disposed rods are slidably mounted in certain of these holes and the bottom end of each is used to support one of the pins. This device is, however, objectionable because of the large size of the base making it difficult to vibrate the impressions which loosen occasionally while the stone is poured causing the relationship of the pins to be lost. Furthermore, a considerable amount of time is lost in mounting the rods in the holes and setting the rods in the desired position.

Thus, the prior equipment is relatively expensive, sometimes slows down the pin setting operation and requires a special kind of dowel pin rather than a conventional dowel pin. Moreover, many prior devices are not adaptable for use in certain kinds of impression trays and some swing on an arc about a vertical axis which can make them difficult to use.

In summary, the general purpose of the invention is to align removable tapered dowel pins within tooth impressions during the preparation in a dental arch impression which is itself held in a dental impression tray. This is done by placing the dowel pin in each negative impression of a tooth requiring a pin so the prepared tooth can be withdrawn preferably by using the split poured impression technique so that the resulting die can be readily worked upon and reinserted to its exact original position.

OBJECTS

The chief objects are to provide a dowel pin aligning and placing apparatus having the following characteristics and advantages a) relative low cost b) simplicity of operation so that its use can be easily learned c) accurate reproducable positioning of the dowel pins d) a minimum of moving parts e) ability to keep the pins parallel and in a vertical position relative to the negative tooth impression f) ability to move the dowel pins a critical vertical distance above the impression to an out of the way position g) provision for moving the dowel pin supporting instrument to a predetermined distance above each negative tooth impression h) a provision for controlling the lowermost position of each of the dowel pins within its corresponding negative tooth impression, i) the technique of using the apparatus is easy to learn, j) it is readily suited for use with commercially available dowel pins, k) is adapted for use with all types of impression materials and trays and l) includes means to effectively prevent the pins from swinging to the side or rear which might interfere with replacement of the dowel pins in their original positions.

THE FIGURES

FIG. 1 is a perspective view of the invention.

FIG. 2 is a side view partly in section of a positive replica, and

FIG. 3 is a partial end view taken on line 3—3 of FIG. 1 on a reduced scale.

SUMMARY OF THE INVENTION

A dowel pin holder and aligning apparatus is provided for aligning and retaining dowel pins in selected positions during a dental casting operation to produce a positive replica of a tooth from a negative impression formed in an impression material. The apparatus consists of the supporting plate or base upon which is preferably mounted a dental tray support or impression holder. A dental tray is supported on the holder and is adapted to receive the dental impression in which the dowel pins are to be placed. A temporary dowel pin holder or retainer is provided above the tray. The temporary pin holder comprises a deformable retaining material having a pierceable surface within which the dowel pins remain temporarily once they are embedded therein. The temporary retainer is supported on a slidable mounting element so that it can be moved with respect to the base and tray along an axis parallel to the axis of the pins and tooth impressions. During use, each pin is placed in the desired location within a tooth impression in the tray. Relative sliding motion is then established between the tray and the temporary retainer while the dowel pin is held in a fixed position within its tooth impression. This forces the dowel pin through the pierceable surface into the deformable retaining material which then holds it in that position. Additional pins are subsequently embedded one by one in the temporary retainer until all of the pins have been properly located. The retainer is then moved to a position in which all of the pins are simultaneously transferred to their proper positions within the impression and a layer of stone is cast around their lower ends. Another layer is then cast around the exposed portions of the pins.

DESCRIPTION OF THE PREFERRED EMBODIMENT

Before describing the apparatus, some background information will be provided to assist in a complete understanding of the invention. The dental pins described herein are used in the dental office or dental laboratory to accurately maintain the position of a prepared tooth with adjacent dentition and provide for removing a die during the construction of the prosthesis. The dowel pin positioner of the present invention is a device used to accurately place the dowel pin in the center of the negative impression of the tooth i.e. the prepared crown abuttment impression which makes (after saw cuts are made) die removal possible after the cast is completed. Proper alignment of the pin is necessary since placement of the pin other than at the center of the tooth impression, i.e. in the interproximal area, makes removal of the die difficult or impossible. Removal of the die from the master cast makes possible margin determination, in other words ditching and finer waxing of the restoration. The ability to place the die back into the master cast in its relationship is critical for the proper fit of the finished prosthesis. In the present invention, conventional dowel pins with extensions are used to support the dies in the proper position.

With reference now to the figures, it will be seen that the dowel pin holding and aligning apparatus is indicated generally at 10. The apparatus consists of a base or supporting plate 12 which is generally rectangular in configuration and a temporary retaining element or platen 14 mounted in vertical alignment above the base 12 upon a pair of sliding elements that define a linear or sliding bearing which will now be described. A pair of tubes 16 and 18 are positioned on a central longitudinal axis of the base 12 in parallel vertical relationship, the tube 18 being closer to the rear end of the base than tube 16. Positioned within the tubes 16 and 18 respectively are supporting posts 20 and 22 which are of the proper size to slide smoothly therein. Their upper ends 23 and 25 are rigidly secured as by adhesive bonding or welding to the upper platen 14.

A vertical adjustment stop collar 26 provided with a thumb screw 28 is mounted upon the post 22 and can be slid up and down on the post after loosening the screw 28 to any desired position and then locked in place by tightening screw 28 for the purpose of controlling the lowermost position of the platen 14. On the tube 18 is provided a fixed collar 19 with a thumb screw 19a the inward end of which extends through to the inside of the tube to hold rod 22 in a selected vertical position when it is tightened. Mounted upon the platen 14 is a substantially homogeneous temporary retaining element 30 which consists of a deformable material having a pierceable surface. Examples of such materials are putty, clay, soft plastic, plastic foam, foamed rubber, soft unfoamed rubber, balsa wood, pith, etc. One preferred material is a foamed polystyrene resin. It will hold the pins in place and is resilient enough so that it will not crack when the pins are inserted. The deformable material 30 can be held in place in any suitable manner such as by retaining pins 32 which extend through the platen 14.

Positioned on the upper surface of the base 12 is a removable tray support plate 31 having side walls 31a on each side and an end wall 31b each located adjacent to a corresponding wall of the base 12. The removable tray support plate 31 is keyed in position by a pair of keying pins 31c and 31d so that when removed, it can be replaced in its exact original position. On the plate 31 is a mounting medium such as waterproof putty 32a which supports a tray 34 inside of which is the plastic impression material 33 containing negative tooth impressions 33a. The long axis of each tooth impression is substantially vertical and parallel to rods 20 and 22.

Secured to the supporting base 12 by means of a pivot P (FIG. 3) is an instrument support bracket arm 35 which can be pivoted about a vertical axis on Pivot P from the rear side of the base 12 as shown in FIG. 1 to a left side thereof as seen in figure or around to the side of the base closest to the observer as needed. Mounted upon the bracket 35 is an upper arm section 37 which can be adjustably positioned by loosening a wing nut 37b to raise or lower a ferromagnetic so as to firmly hold a grasping instrument such as a pliers 36 securely in place while each successive pin 38 is easily located in the best vertical position during its initial placement within its tooth impression 33a. With the nut 37b tightened, each successive pin 38 is grasped by the pliers 36. Lowering the platen 14 will then locate each pin 38 at the selected distance above the lower end of its tooth impression 33a. The pliers 36 are provided with a smooth, flat, lower horizontal surface which rests on the upper surface on the magnetic plate 37a, to securely hold each pin in a vertical position while it is forced into the foam element 30.

To locate the pins, the platen 14 and the deformable pin retaining material 30 are lowered by pressing manually on its upper surface thereby forcing the posts 20 and 22 into the tube 16 and 18 until the stop 26 strikes the upper end of the tube 18. As this takes place, a piercing element e.g. a needle 38a telescopically and removably mounted over the upper end of the pin 38 will penetrate the deformable material 30 and will be securely retained therein. The grip of the pliers on the pin 38 is then loosened and the spring 24 is allowed to lift the platen and the pin retainer 30 to the position shown in FIG. 1, raising with it the pin which has just been embedded therein. Once all of the pins have been thus located within the temporary retaining element 30, the support plate 31 containing the impression tray is removed from the base. The stone layer A is poured and while still fluid, subjected to mechanical vibration on a vibrator to remove bubbles and voids, then returned and relocated by pins 31c and 31d. With the stone still soft, the platen 14 is lowered to its lowermost position whereupon all the pins will simultaneously be returned to their original positions within their corresponding tooth recesses 33a. The thumb screw 19a is then tightened. The stone is then allowed to harden with pins in place. After the stone layer A has hardened, the screw 19a can be loosened and the spring 24 allowed to elevate the platen 14 to its uppermost position. The needle portions 38a are removed and a layer of wax can be applied at line 40 to the upper surface of the stone A. A second layer B is then cast thereon conventionally and the plate 31 removed again to permit vibration of the impression tray and soft layer B. The die is indicated by the numeral 43 and the tooth by the numeral 46. Each pin 38 is composed of a knurled section within the die 43 and a long tapered section 52. To remove any individual tooth, saw cuts 47 and 49 are made conventionally to line 40 whereupon when the tooth is raised, the lower half 52 of the pin slides out of the stone 42.

It will thus be seen that the adjustable stop 26 prevents the platen 14 and the deformable retaining material 30 with its pins at 38 from traveling downwardly beyond a predetermined point, namely, the original location of the pins 38 at the time they were inserted with their lower knurled ends centered in the tooth impressions 33a and spaced from the lower end thereof. The thumb screw 19a which functions as a releasable locking means will securely hold the platen 14 and pins 38 in their lowermost position as controlled by stop 26. The fasteners 32 can be removed any time the deformable retaining material 30 requires replacement. This is not necessary very often and I have found when a medium grade of polystyrene foam is used, several sets of dentures may be repaired before the foam 30 needs to be replaced.

Thus, during use as each succeeding pin is placed in the deformable retainer 30, the opeator moves the pliers 36 and the plate 37a with its flat horizontal upper surface around the end of the supporting block 12 to each successive position which is most convenient by pivoting it about pivot P. Since the top surface of plate 37a is flat and located above the tray in a horizontal plane perpendicular to the posts 20 and 22, the pliers 36 will because of the magnetic attraction between them and the holder 37a be tightly held against the plate thereby holding each pin 38 in a vertical or almost vertical position. The needle 38a is removably affixed to the upper end of the portion 52. Once the initial stone A has hardened, the needle 38a is removed and the second pour B is made.

An important advantage of the invention is that vibration of each fresh layer of stone is made possible without dislodging the pins due to the removabilitiy and relocatability to the plate 31 to its exact original position.

In the above description, a disclosure of the principles of this invention is presented, together with some specific examples by which the invention may be carried out.

What is claimed is:

1. A dowel pin holding and aligning apparatus for aligning and retaining dowel pins in selected positions during a dental casting operation in making a positive replica of a tooth from a negative impression which is formed in an impression material, said apparatus comprising a supporting base, said base being adapted to support a dental tray for a dental impression in which the dowel pins are to be placed, a temporary dowel pin holder above said portion of the base adapted to support the tray, the temporary dowel pin holder comprising a deformable retaining material having a pierceable surface within which the dowel pins remain temporarily once they are embedded therein, a slidable mounting element supporting the temporary retainer on the base such that the temporary retaining element can be moved with respect to the base and tray along an axis parallel to the axis of the pins and parallel to the longitudinal axis of the negative impression of the teeth within which the pins are to be located, that is to say substantially normal to the plane of the tray on the base, each dowel pin including a needle-like piercing element, whereby during use each pin can be placed in desired locations within a tooth impression in the tray, relative sliding motion can then be established between the base and the temporary retainer while the dowel pin is held in position within its tooth impression thereby forcing the dowel pin into the deformable retaining material which then holds the dowel pin in place and locates each of said dowel pins a selected distance above the lower end of its tooth impression thereafter while each additional successive pin is embedded one after another in the temporary retaining element until all of the pins have been properly located and the retainer being then movable to a position in which all of the pins are simultaneously transferred to their original positions within the negative tooth impressions of the tray for the casting of stone around the end of the pins within the negative tooth impressions.

2. The apparatus of claim 1 wherein the slideable mounting element is a rod slideable within a tube, a stop means is operatively connected between the temporary dowel pin holder and the base for limiting the movement of the holder and the pins in the direction of the base, said stop means comprises a collar on the rod with a releasable retaining means for selectively changing the position of the collar.

3. The apparatus of claim 1 wherein a resiliant element is provided for yieldably biasing the holder upwardly from the base.

4. The apparatus of claim 1 wherein the pin holder comprises a cellular material composed of plastic resinous foam.

5. The apparatus of claim 1 wherein the pins are temporarily held in place with a grasping tool and the grasping tool is supported upon a bracket secured to the base and located above the tray when the tray is in place upon the base.

6. The apparatus of claim 5 wherein the bracket comprises a first arm member pivoted to the base and extending laterally therefrom, a vertically disposed second arm member at the free end of the first arm and a support plate at the free end of the second arm member for supporting the grasping tool.

7. The apparatus of claim 6 wherein the supporting plate is made of a magnetic material to securely retain the grasping tool in close contact therewith.

8. The apparatus of claim 7 wherein the first arm member is pivoted to the base for pivotal movement on an axis normal to the plane of the tray.

9. The apparatus of claim 1 wherein a tray holding plate is removably mounted on the top surface of the base, the tray holding plate having indexing means for locating it removably in a predetermined position relative to the base whereby it can be removed and replaced periodically to its exact original position and a deformable mounting medium on the plate to support the tray.

10. The apparatus of claim 5 wherein the supporting plate is vertically adjustable to selected positions to allow the position of the grasping means to be elevated or lowered as needed.

11. The apparatus of claim 8 wherein the length of the second arm member is adjustable and means for releasably locking the second arm member at selected lengths.

* * * * *